US012731318B2

(12) United States Patent
Vendrow et al.

(10) Patent No.: US 12,731,318 B2
(45) Date of Patent: Sep. 8, 2026

(54) SYSTEM AND METHOD FOR GENERATING AVATAR OF AN ACTIVE SPEAKER IN A MEETING

(71) Applicant: RingCentral, Inc., Belmont, CA (US)

(72) Inventors: Vlad Vendrow, Reno, NV (US); Igor Vladimirovich Kamyshev, Tbilisi (RU)

(73) Assignee: RingCentral, Inc., Belmont, CA (US)

( * ) Notice: Subject to any disclaimer, the term of this patent is extended or adjusted under 35 U.S.C. 154(b) by 169 days.

(21) Appl. No.: 18/089,426

(22) Filed: Dec. 27, 2022

(65) Prior Publication Data

US 2024/0212248 A1 Jun. 27, 2024

(51) Int. Cl.
*G06T 13/40* (2011.01)
*G10L 17/22* (2013.01)

(52) U.S. Cl.
CPC .............. *G06T 13/40* (2013.01); *G10L 17/22* (2013.01)

(58) Field of Classification Search
CPC ................................ G06T 13/40; G10L 17/22
See application file for complete search history.

(56) References Cited

U.S. PATENT DOCUMENTS

2014/0218371 A1* 8/2014 Du .......................... G06T 13/40 345/473
2015/0070351 A1* 3/2015 Tarquini .................. G06T 17/20 345/419
2023/0222721 A1* 7/2023 Chen ....................... G06T 13/40 345/419
2023/0252972 A1* 8/2023 Harazi .................. G10L 13/047 704/259
2024/0078731 A1* 3/2024 Beith .................... G06T 13/205
2024/0112389 A1* 4/2024 Buzzelli .................. G06F 3/012
2024/0129437 A1* 4/2024 Zhang ..................... G06T 13/00
2024/0312095 A1* 9/2024 Wei .......................... G06N 3/09

* cited by examiner

*Primary Examiner* — Kee M Tung
*Assistant Examiner* — Khoa Vu

(57) ABSTRACT

A method includes receiving a facial data associated with a participant user; generating an avatar data of the participant user based on the facial data using a first machine learning (ML) model; receiving data associated with facial movement; and training the generated avatar based on the data associated with facial movement using a second ML model to generate a trained avatar data, wherein the trained avatar data mimics appropriate facial movements associated with audio data.

16 Claims, 8 Drawing Sheets

SYSTEM AND METHOD FOR GENERATING AVATAR OF AN ACTIVE SPEAKER IN A MEETING

TECHNICAL FIELD

The present disclosure relates generally to the field of computer collaborative communications environments. Specifically, the present disclosure relates to systems and methods for generating an avatar of a meeting participant without a video stream where the avatar mimics appropriate lip movements as the participant without a video stream speaks.

BACKGROUND

Online collaborative communications environments such as online chats, video conferencing, etc., between various entities and/or individual participants whether within the same organization or different organizations have increased in popularity with the advent of the Internet. Moreover, online meetings whether audio, video, or a combination thereof have become prevalent in today's society especially given the changes due to Covid-19 and the pandemic. Many businesses are now being conducted either partially or almost entirely online by leveraging various online collaborative communications environments, e.g., RingCentral®, Zoom™, Microsoft Teams®, Slack®, etc.

It is appreciated that quite often one or more meeting participants may attend an online meeting with audio only features and without video feed for one or more reasons. For example, in some instances where the meeting participant may be bandwidth limited, the video feature may be turned off (i.e., no video being transmitted from the meeting participant) in order to save bandwidth transmission. In yet, other examples, a meeting participant may not be camera ready and choose to participate with audio only. In yet, another example, a meeting participant may be presenting on a board and the video feed, if any, renders the information on the whiteboard rather than focusing on the video feed of the meeting participant that is speaking.

Unfortunately, meetings with audio only and without a video stream may not be as effective as meetings with video feed of the meeting participants. Additionally, often times online collaborative meeting may be conducted with individuals that participants may not have met in person and, as such, lack the ability to put a face to the name. Some conventional systems have attempted to address this need by simply attaching a static image of the person. Unfortunately, a static image of a meeting participant that is being attached is no way animated or dynamic (i.e., the static image does not move) as the meeting participant becomes an active speaker.

SUMMARY

Accordingly, a need has arisen to generate an avatar of a meeting participant that resembles the facial features of the participant accurately where the avatar moves, e.g., the lips movement mimic the appropriate lips movement, when the participant becomes an active speaker and speaks. The appended claims may serve as a summary of the invention.

DETAILED DESCRIPTION

Figure 1:
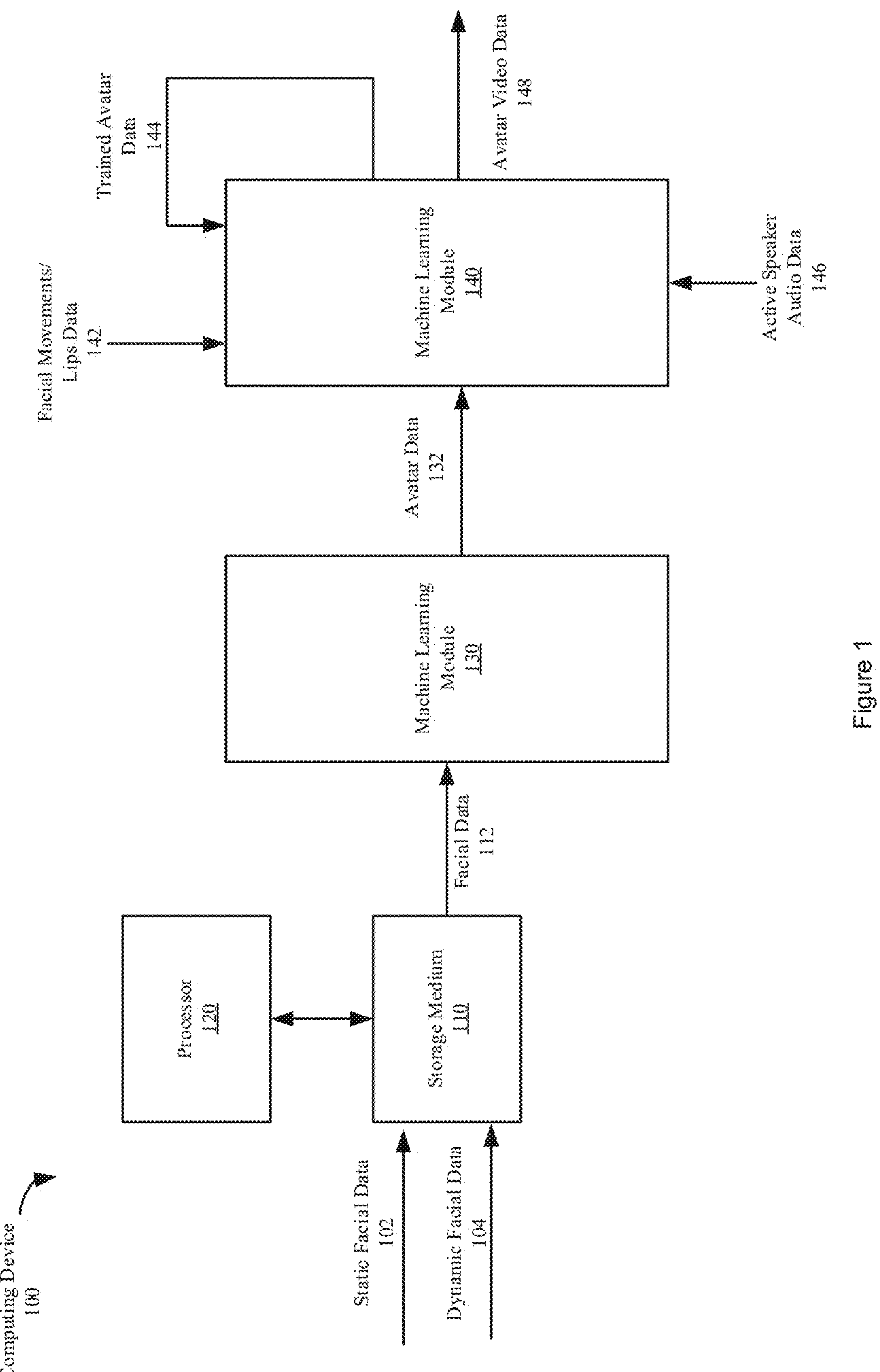
FIG. 1 is a diagram of a system that generates an avatar of a meeting participant that mimics the appropriate movements when the participant becomes an active speaker and speaks in accordance with some embodiments of the present disclosure.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", "retrieving", "injecting", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

A term conference session or online collaborative meeting/session means, without limitation, two or more people communication using audio and/or video communication means through any type of user device or virtual reality techniques, any type of webinar or any type of podcast or any type of recorded video/audio stream. It is appreciated that a term "avatar", without limitation, may include a computer representation of one or more users in a computer-generated world, e.g., 3-dimensional (3-D) world, in an online collaborative environment and/or meetings. It is appreciated that an avatar of a person may be a very close representation of the person itself, making the two virtually indistinguishable from one another.

A need has arisen to generate an avatar (i.e., avatar data) of a person participating in an online collaborative environment where no video stream associated with facial features of the person participating is being transmitted. Moreover, a need has arisen to inject a generated avatar video stream and transmit it to other participants of the online collaborative environment.

It is appreciated that in some embodiments, machine learning may be utilized to generate an avatar of a person participating in an online collaborative environment. According to some embodiments, a static image of a participant or a dynamic set of images (e.g., one or more video frames) of the participant may be obtained at some point prior to the participant becoming an active speaker in the online collaborative environment. For example, a picture of the participant, a video of participant, etc., may be fetched from a storage medium and transmitted to a first ML module. The first ML module may generate an avatar data associated with the participant based on the images that have been received and processed. It is appreciated that the avatar data is a very close representation of the participant itself, where the participant is virtually indistinguishable from the generated avatar or with very minor differences. In some embodiments, a second ML module is used to train the generated avatar to move, e.g., lips movement of the avatar mimicking appropriate lips movement associated with spoken words. It is appreciated that the spoken words used to train the generated avatar in the second ML module may come from the participant itself (e.g., video frame of the participant speaking a few sentences showing the lips movement) in order to mimic the participant's lips movement with appropriate accent. However, in some embodiments, the generated avatar may be trained using spoken words from a person other than the participant itself. Either way, the generated avatar is trained to mimic lips movements associated with particular spoken words. Once the generated avatar is trained, live data may be received, e.g., during an online collaborative environment session/meeting. The live data may be audio only data associated with a participant user where the trained avatar has been generated. Once the participant user becomes an active speaker, the trained avatar mimics the spoken word by the participant user and the generated video stream is injected into the data stream being transmitted to other participants of the online collaborative environment session/meeting.

Referring now to FIG. 1, a diagram of a system (computing device 100) that generates an avatar of a meeting participant that mimics the appropriate movements when the participant becomes an active speaker and speaks in accordance with some embodiments of the present disclosure is shown. The computing device 100 may be a server that facilitates online collaborative environment for participants of a meeting/session. In some embodiments, the computing device 100 includes a storage medium 110, a processor 120, a first ML module 130, and a second ML module 140. The storage medium 110 may include any non-transitory medium that stores data, e.g., a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The processor 120 may be a central processing unit (CPU), a graphics pipeline unit (GPU), a field programmable gate array (FPGA), an application specification integrated circuit (ASIC), or any combination thereof. The ML modules 130 and/or 140 may be a ML dedicated hardware or may be implemented using a processor 120 described above. It is appreciated that the ML modules 130 and 140 are shown as separate modules for illustration purposes only and should not be construed as limiting the scope of the embodiments. For example, the ML modules 130 and 140 may be implemented as a single ML module in some embodiments.

It is appreciated that static facial data 102 may be received and stored in the storage medium 110. The static facial data 102 may include static images of the participants that may come from different sources, e.g., provided by the participants themselves, fetched from social media, etc. For example, participants may take one or more pictures of themselves and transmit that as static facial data 102. It is appreciated that in some embodiments static facial data 102 may include a 360 degree images or a portion thereof, 3-D spin images, or any other static media. In some embodiments, dynamic facial data 104 may be received and stored in the storage medium 110. The dynamic facial data 104 may include video frames of the participants that may come from different sources, e.g., provided by the participants themselves, fetched from social media, etc. For example, the participants may be prompted to take a short video of their facial features by rotating the video camera around and to send the short video as dynamic facial data 104. It is appreciated that dynamic facial data 104 may provide additional information regarding facial features in comparison to static facial data 102.

The static facial data 102 and/or dynamic facial data 104 may be processed by the processor 120 and the processed data may be stored back in the storage medium 110. The processed data may include one or more of cropping, applying a filter, adjusting the brightness, etc.

According to one nonlimiting example, the data stored in the storage medium 110 (whether processed or not) may be transmitted as facial data 112 to the ML module 130. The ML module 130 may apply one or more ML models to the received facial data 112 and generate an avatar data 132 associated with the participant. The avatar data 132 is a computer representation of the participant that may be virtually indistinguishable from the participant itself. It is appreciated that in some embodiments the existing avatar may be imported and stored in a storage medium.

Once the avatar data 132 is generated, it may be transmitted to ML module 140 such that the avatar data 132 is trained to mimic certain movements, e.g., correct/appropriate movements of lips with particular spoken words. In this nonlimiting example, the ML module 140 receives the avatar data 132 that was generated for the participant and is unique to that participant as well as receiving facial movements/lips data 142. It is appreciated that facial movements/lips data 142 may include data associated with facial movements and facial expressions associated with a person speaking such as lips movement, raising eyebrows, jaw movement, eyes movements, etc. for spoken words. For example, lips move in a particular way to pronounce "wow" that is different from the way lips move pronouncing "yikes." It is appreciated that the facial movements/lips data 142 may also include certain tonal/pitch data, e.g., anger, happiness, excitement, whisper, etc. It is appreciated that the facial movements/lips data 142 may originate from the participant to capture accent, tone, pitch, etc. For example, the participant, at some point when the avatar is being created or before, may be asked to transmit a video of the participant's lips movement saying particular sentences, e.g., "Wow I loved that", "Yikes that hurts", "I am super frustrated", "I am burnt out and looking forward to my vacation by the beach," etc. In some examples, the facial movements/lips data 142 may be originated from someone other than the participant itself, e.g., from the system administrator, from a collection of random movies, etc. Accordingly, the avatar data 132 is trained using facial movements/lips data 142 (e.g., in a supervised ML model). However, it is appreciated that in some embodiments, the avatar may be trained in an unsupervised ML fashion (i.e., without using the facial movements/lips data 142 and trained over time with live data). The avatar data 132 once trained becomes trained avatar data 144 and may be output to a different module or it may be stored in the ML module 140 itself.

It is appreciated that now the avatar associated with a participant user (i.e., participant of an online collaborative environment meeting/session) is now trained. It is appreciated that this process may be repeated for each participant user of an online collaborative environment meeting/session or for a subset of the participant users.

Accordingly, when/if the participant user is not transmitting video streams of the participant user itself, the trained avatar data may be used to inject video stream of the participant user and transmit that to other participants in the meeting. For example, in some embodiment, the participants join a meeting and a participant, say John, may only transmit audio data (e.g., due to bandwidth issues). However, John's avatar may have been generated and trained, as described above. As such, when John becomes an active speaker (i.e., speaks), John's avatar video stream that mimic the audio data from John is injected and transmitted to other participants of the meeting. For example, the system may detect that John is now an active speaker when he starts speaking. The active speaker audio data 146 without any video stream of John's facial features may be received. The trained avatar associated with John (i.e., ML model for John) is used with the audio data from John to mimic the appropriate/specific lips movement for the spoken words to generate an avatar video data 148. In other words, the avatar video data 148 is the trained avatar associated with John that moves lips specific to the spoken word in the active speaker audio data 146.

It is appreciated that the avatar video data 148 may be injected by the server (i.e., computing device 100) into the data being transmitted to other participants of the online collaborative environment meeting/session. In other words, although no video stream of John is being transmitted by John's device, an avatar video stream associated with John is generated by the computing device 100 that facilitates the online collaborative environment and injected into the data stream being transmitted to other participants of the meeting/session. As such, other participants of the meeting now benefit from a video stream of John that is realistic (i.e., almost indistinguishable from John himself with appropriate facial movements and facial expressions associated with a person speaking such as lips movement, raising eyebrows, jaw movement, eyes movements, etc.), without John actually transmitting a video stream of himself during the meeting/session.

Figure 2:
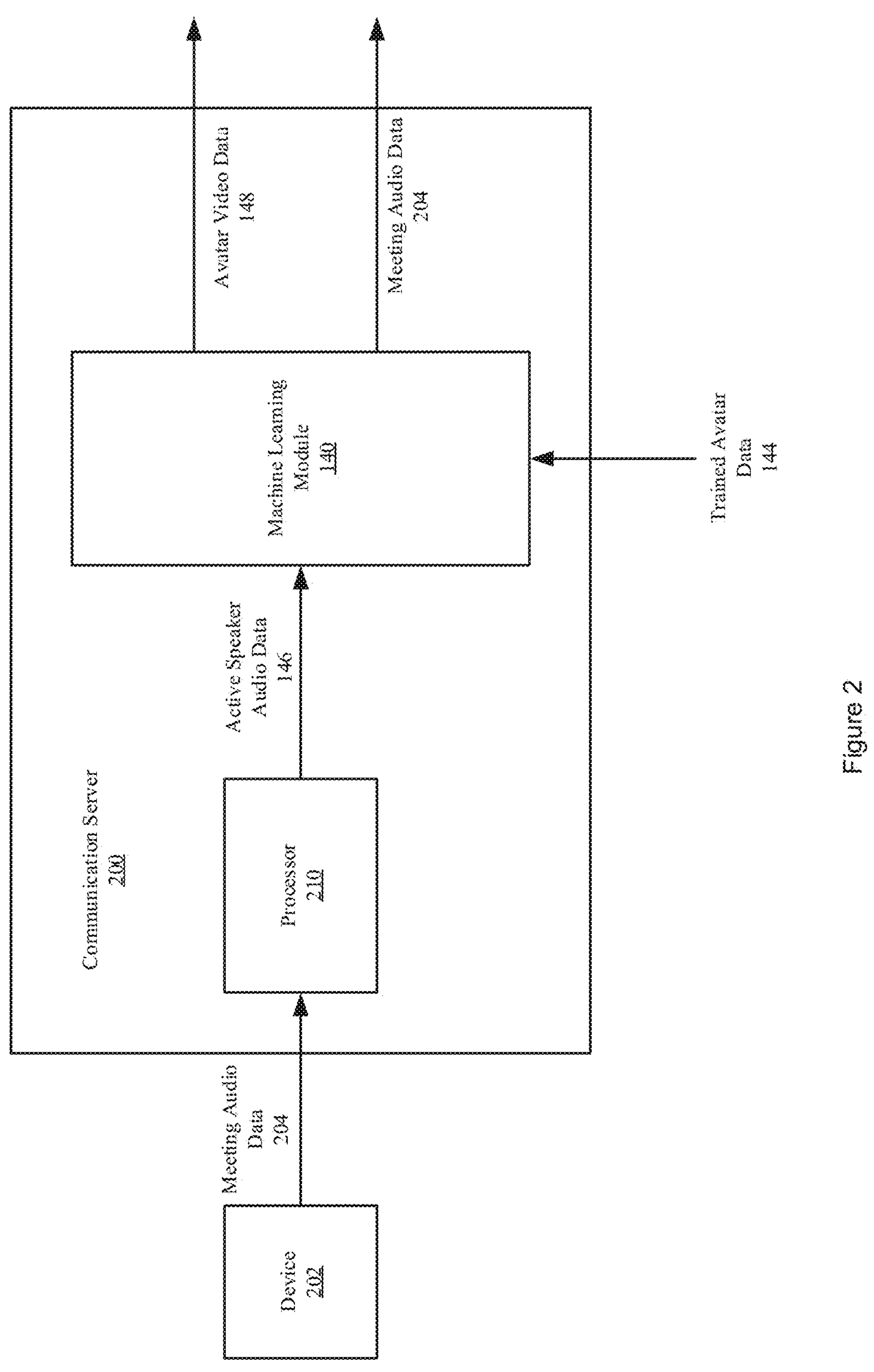
FIG. 2 is a diagram of a system that identifies a participant within an online collaborative environment as an active speaker and injects a generated avatar video stream associated with the active speaker in accordance with some embodiments of the present disclosure.

Referring now to FIG. 2, a diagram of a system that identifies a participant user within an online collaborative environment as an active speaker and injects a generated avatar video stream associated with the active speaker in accordance with some embodiments of the present disclosure is shown. In this nonlimiting example, the avatar associated with a participant user has been generated and trained, as discussed in FIG. 1, or imported. In this example, practical application of the trained avatar that has been created to live data is described for illustrative purposes that should not be construed as limiting the scope of the embodiments. In this example, device 202 may be associated with a participant user, e.g., John. The communication server 200 may include a processor 210 and the ML module 140. The communication server 200 may be a server that facilitates the online collaborative environment for participant users. It is appreciated that once the meeting/session has been initiated, data may be received from one or more users. In this nonlimiting example, meeting audio data 204 being generated by a participant user, e.g., John, is being transmitted from device 202 to the communication server 200. It is appreciated that, in this nonlimiting example, there is no video stream of John, e.g., there is no video stream at all or if there is one it is of a whiteboard or something other than John's facial features. The meeting audio data 204 is received by the processor 210 that may be similar to the processor described in FIG. 1. The processor 210 may identify the participant user that the meeting audio data 204 is being received from as the active speaker. In one nonlimiting example, the processor 210 may use voice recognition to identify the participant user. Regardless of the methodology by which the participant user is being identified, the processor 210 transmits the active speaker audio data 146 to the ML module 140. It is appreciated that the active speaker audio data 146 may include the identification of the participant user, e.g., John in this case, and the audio data themselves, e.g., spoken words by John, during the meeting/session.

The ML module 140 may receive the active speaker audio data 146 from the processor 210. It is appreciated that the ML module 140 may also receive the trained avatar data 144 corresponding to the identified active speaker (i.e., in this case John). In other words, the trained avatar data 144 is the trained avatar for John. In some embodiments, the trained avatar data 144 may be fetched from a database (not shown here). However, in some embodiments, the trained avatars for the participant users may be stored within the ML module 140 such that there would be no need to fetch them from a database. The ML module 140 applies the meeting audio data 204 (associated with John) to the trained avatar data 144 (associated with John) to generate the avatar video data 148 that in this case is specific to the participant user (i.e., John). The avatar video data 148 generated is based on the spoken words (i.e., meeting audio data 204). The avatar video data 148 may be now injected into the data being transmitted to other participant users of the meeting/session. In other words, the communication server 200 generates the avatar video data 148 when there is no video stream associated with the participant user that is now an active speaker and transmits the avatar video data 148 along with the meeting audio data 204 to other participant users of the meeting/session.

It is appreciated that the embodiments are described with respect to the server generating the avatar data, training the avatar data, etc. However, it is appreciated that in some embodiments, the avatar may be generated and trained using the participant user device (prior to becoming an active speaker). The trained avatar generated by the participant user device may be stored on the user device and transmitted to the server once the participant user joins an online collaborative environment, e.g., meeting.

Figure 3A:
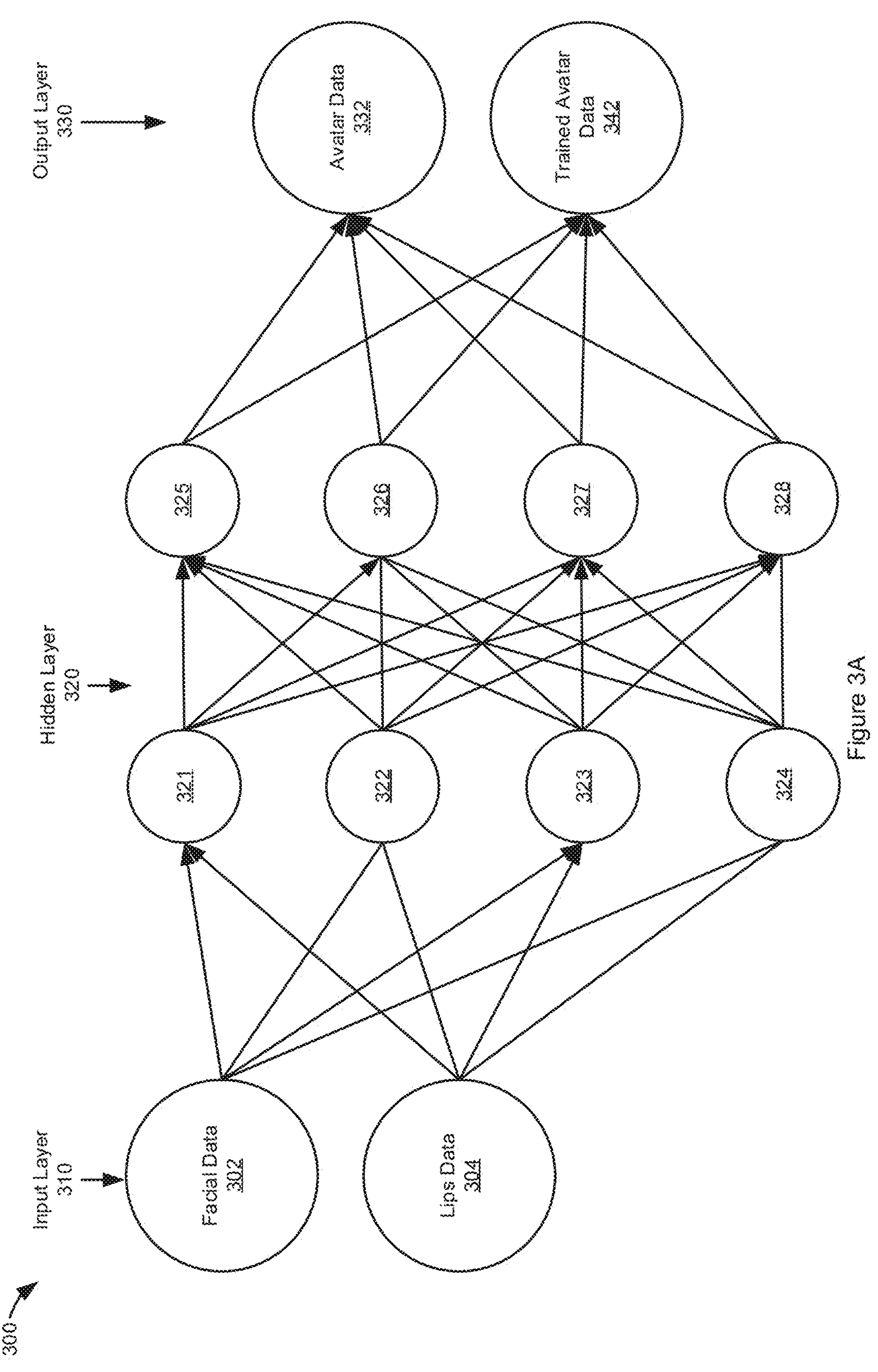
FIG. 3A is a diagram of one Machine Learning (ML) technique in accordance with some embodiments of the present disclosure.

Referring to FIG. 3A, a neural network 300 may utilize an input layer 310, one or more hidden layers 320, and an output layer 330 to train a machine learning algorithm or model to generate an avatar data and train the generated avatar data to perform certain lips movement associated with spoken words, in accordance with some embodiments. In some embodiments, supervised learning is used such that known input data, a weighted matrix, and know output data is used to gradually adjust the model to accurately compute the already known output. In other embodiments, where input layer 310 and/or the output layer 330 are not known, unstructured learning may be used such that a model attempts to reconstruct known input data over time in order to learn.

Training of the neural network 300 using one or more training input matrices, a weight matrix and one or more known outputs is initiated by one or more computers associated with the computing device 100 and/or communication server 200. For example, the computing device 100/200 may be trained by one or more training computers and, once trained, used in association with the user device 202. In an embodiment, a computing device may run known input data through a deep neural network 300 in an attempt to compute a particular known output. For example, a server computing device uses a first training input matrix and a default weight matrix to compute an output. If the output of the deep neural network does not match the corresponding known output of the first training input matrix, the server adjusts the weight matrix, such as by using stochastic gradient descent, to slowly adjust the weight matrix over time. The server computing device then re-computes another output from the deep neural network with the input training matrix and the adjusted weight matrix. This process continues until the computer output matches the corresponding known output.

The server computing device then repeats this process for each training input dataset until a fully trained model is generated.

In the example of FIG. 3A, the input layer 310 includes a plurality of training datasets that are stored as a plurality of training input matrices in an associated database. The training input data includes, for example, facial data 302 (i.e., static facial data, dynamic facial data, or a combination thereof) and lips data 304 as described in FIG. 1. The facial data 302 and the lips data 304 are substantially similar to those described above with respect to FIGS. 1-2. While the example of FIG. 3A uses a single neural network, in some embodiments, separate neural networks 300 would be trained to generate an avatar data associated with a participant user and/or train the generated avatar data, as described above. For example, one neural network 300 would be trained to generate an avatar data associated with a participant user while another neural network 300 would be trained to train the generated avatar data based on lips data and so forth. Any number of neural networks, in any combination, may be used to generate the avatar data and to train the generated avatar data.

In the embodiment of FIG. 3A, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3A features two hidden layers 320, the number of hidden layers is not intended to be limiting. For example, one hidden layer, three hidden layers, ten hidden layers, or any other number of hidden layers may be used for a standard or deep neural network. The example of FIG. 3A also features an output layer 330 with the avatar data 332 and trained avatar data 342 as the known output. The avatar data 332 generates a specific avatar for a given participant user such that the generated avatar would be virtually indistinguishable from the participant user itself. The trained avatar data 342 trains the generated avatar such that the avatar mimics certain movements, e.g., correct/appropriate movements of lips with particular spoken words. As discussed above, in this structured model, the avatar data 332 and trained avatar data 342 are used as a target output for continuously adjusting the weighted relationships of the model. When the model successfully outputs the avatar data 332 and the trained avatar data 342, then the model has been trained and may be used to process live or field data.

Figure 3B:
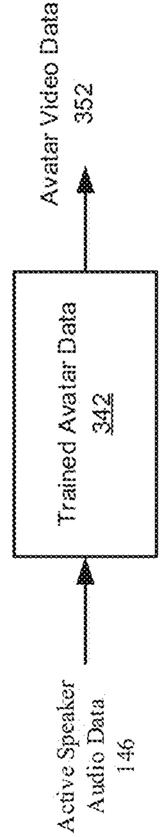
FIG. 3B is a diagram of applying live data to the generated and trained avatar data in accordance with some embodiments of the present disclosure.

Once the neural network 300 of FIG. 3A is trained, the trained servers 100 or 200 will accept field data at the input layer 310. For example, referring now to FIG. 3B, the active speaker audio data 146 is received and applied to the generated and trained avatar data 342 to generate the avatar video data 352 as its output. It is appreciated that the avatar video data 352 is similar to avatar video data 148, associated with the participant user and trained to mimic the lips movement of the participant user based on the spoken words.

Figure 4:
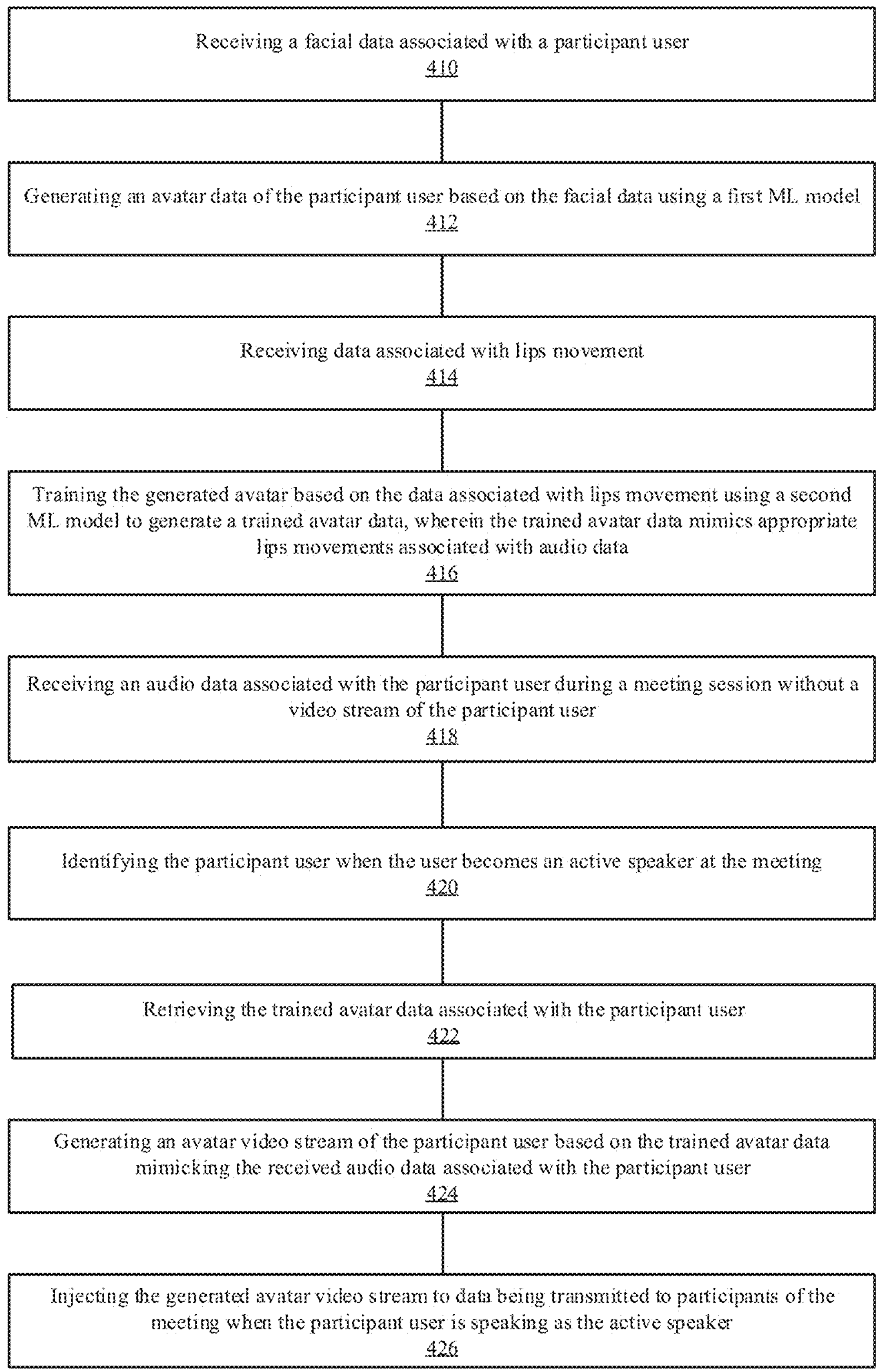
FIG. 4 is a flow chart of a method for generating an avatar of a participant of an online collaborative environment in accordance with some embodiments of the present disclosure.

FIG. 4 is a flow chart of a method for generating an avatar of a participant of an online collaborative environment in accordance with some embodiments of the present disclosure. At step 410, a facial data associated with a participant user is received, as described above in FIGS. 1-3B. It is appreciated that the facial data may be a static image received from the participant user itself or from an application that is different from the online collaborative environment that facilitates an online meeting for the participant user. In one nonlimiting example, the facial data may include at least a portion of a video stream (e.g., video recording by a user taking video around the user's facial features). At step 412, an avatar data of the participant user is generated based on the facial data using a first ML model, as described above in FIGS. 1-3B. At step 414, data associated with lips movement (either from the participant user or a user other than the participant user) is received, as described above in FIGS. 1-3B. At step 416, the generated avatar is trained based on the data associated with lips movement using a second ML model to generate a trained avatar data, wherein the trained avatar data mimic appropriate lips movements associated with audio data, as described above in FIGS. 1-3B. At step 418, an audio data associated with the participant user during a meeting session is received without a video stream of the participant user, as described above in FIGS. 1-3B. At step 420, the participant user is identified (e.g., using voice recognition) when the user becomes an active speaker at the meeting, as described above in FIGS. 1-3B. At step 422, the trained avatar data associated with the participant user is retrieved, as described above in FIGS. 1-3B. At step 424, an avatar video stream of the participant user is generated based on the trained avatar data mimicking the received audio data associated with the participant user, as described above in FIGS. 1-3B. At step 426, the generated avatar video stream is injected into data being transmitted to participants of the meeting when the participant user is speaking as the active speaker, as described above in FIGS. 1-3B.

It is appreciated that injecting the generated avatar video stream into data being transmitted complements the data being transmitted during the meeting session without video stream of the participant user.

Figure 5:
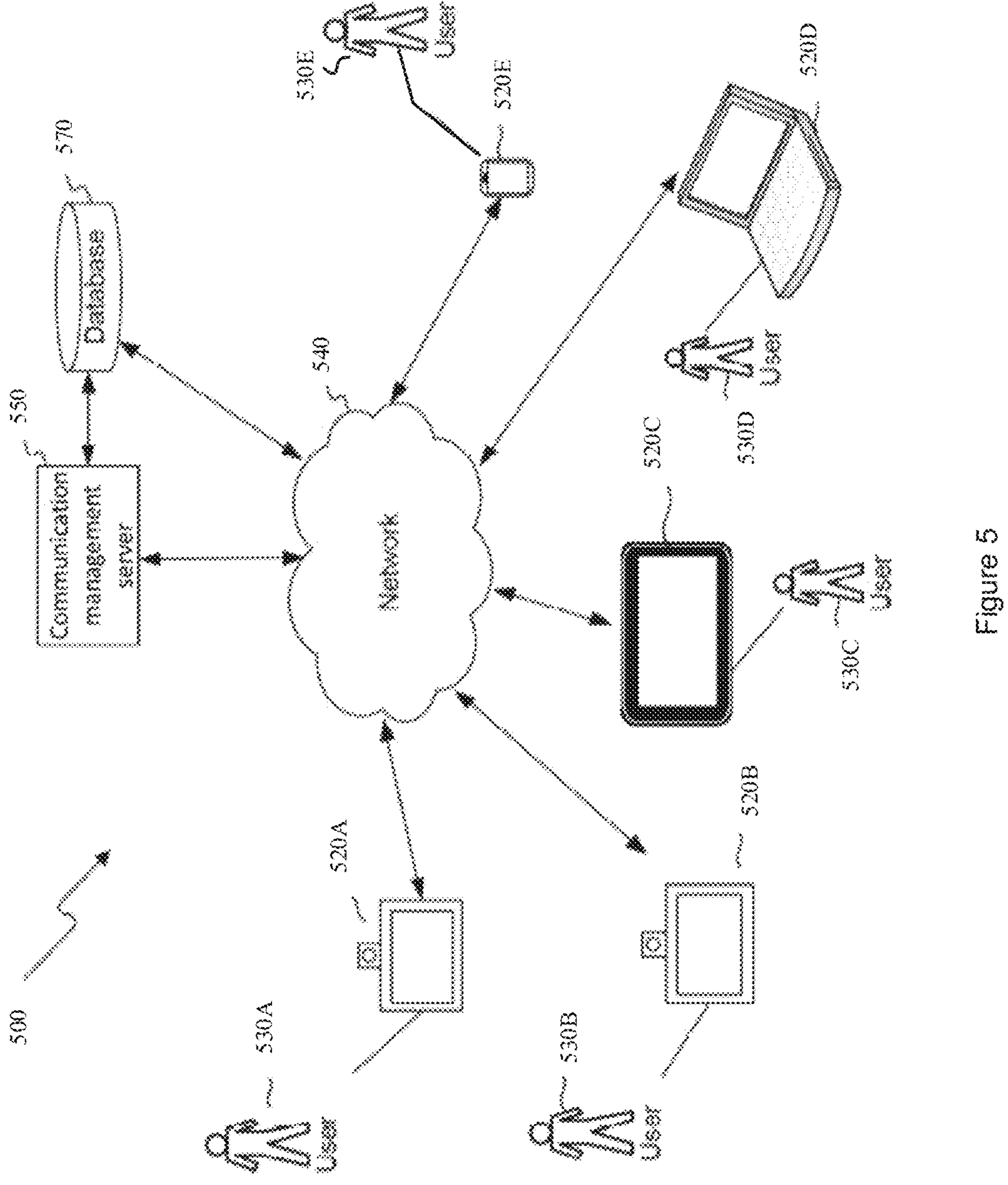
FIG. 5 is a diagram of a communication management system, in accordance with some embodiments of the present disclosure.

FIG. 5 shows an example of a conference management system 500 in which various implementations as described in FIGS. 1-4 may be practiced. Communication management system 500 may enable a plurality of users to schedule communication sessions, run communication sessions, share content during communication sessions and record communication sessions. In some examples, one or more components of communication management system 500, such as communication management server 150, can be used to implement computer programs, applications, methods, processes, or other software to perform the described techniques and to realize the structures described herein.

As shown in FIG. 5, communication management system 500 may include one or more user devices 520A-520E (collectively, referred to as user devices 520), a network 540, a communication management server 550, and a database 570. The components and arrangements shown in FIG. 5 are not intended to limit the disclosed embodiments, as the system components used to implement the disclosed processes and features can vary.

The network 540 may facilitate communications and sharing of communication session content and media between user devices 520 (some or all) and the communication management server 550. The network 540 may be any type of network that provides communications, exchanges information, and/or facilitates the exchange of information between the communication management server 550 and user devices 520. For example, the network 540 may be the Internet, a Local Area Network, a cellular network, a public switched telephone network ("PSTN"), or other suitable connection(s) that enables communication management system 500 to send and receive information between the components of communication management system 500. A network may support a variety of electronic messaging formats and may further support a variety of services and applications for user devices 520.

The communication management server 550 can be a computer-based system including computer system components, desktop computers, workstations, tablets, hand-held computing devices, memory devices, and/or internal network(s) connecting the components. The communication management server 550 may be configured to provide communications sessions, such as setting up communication sessions for users 530A-530E. The communication management server 550 may be configured to receive information from user devices 520 over the network 540, process the information, store the information, manipulate the information and/or transmit communication session information to the user devices 520 over the network 540. For example, the communication management server 550 may be configured to analyze a facial data sent by users 530A-530E or from a different source, generate avatar data associated with the user, and train the avatar data to mimic lips movement associated with spoken words to generate a trained avatar such that when a user becomes an active speaker and speaks at a meeting without a video stream of the user itself, the trained avatar can generate a video stream and inject it into the data being transmitted to other participants of the meeting/session. The communication management server 550 may store one or more ML models, the generated avatar data, the trained avatars, etc., in database 570 in order to fetch the appropriate data and to generate appropriate video stream of a participant user when needed.

In some implementations, the functionality of the communication management server 550 described in the present disclosure is distributed among one or more of the user devices 520. For example, one or more of the user devices 520 may perform functions such as generating avatar data, training the generated avatar, etc.

The database 570 may include one or more physical or virtual storages coupled with the communication management server 550. The database 570 may be configured to store communications session information received from user devices 520, profiles of the users 530 such as contact information and images of the users 530, recording of the communication session, generated avatar data for users, the trained avatar data for users, etc. The database 570 may further include images, audio signals, and video signals received from the user devices 520. The data stored in the database 570 may be transmitted to the communication management server 550 for processing to generate the avatar data, train the avatar data, etc. In some embodiments, the database 570 is stored in a cloud-based server (not shown) that is accessible by the communication management server 550 and/or the user devices 520 through the network 540. While the database 570 is illustrated as an external device connected to the communication management server 550, the database 570 may also reside within the communication management server 550 as an internal component of the communication management server 550.

As shown in FIG. 5, users 530A-530E may communicate with communication management server 150 using various types of user devices 520 via network 540. As an example, user devices 520A, 520B, and 520D may include a display such as a television, tablet, computer monitor, video conferencing console, or laptop computer screen. User devices 520A, 520B, and 520D may also include video/audio input devices such as a video camera, web camera, or the like. As another example, user devices 520C and 520E may include mobile devices such as a tablet or a smartphone having display and video/audio capture capabilities. User devices 520 may also include one or more software applications that facilitate the user devices to engage in communications, such as IM, text messages, EMAIL, VOIP, video conferences, with one another.

Figure 6:
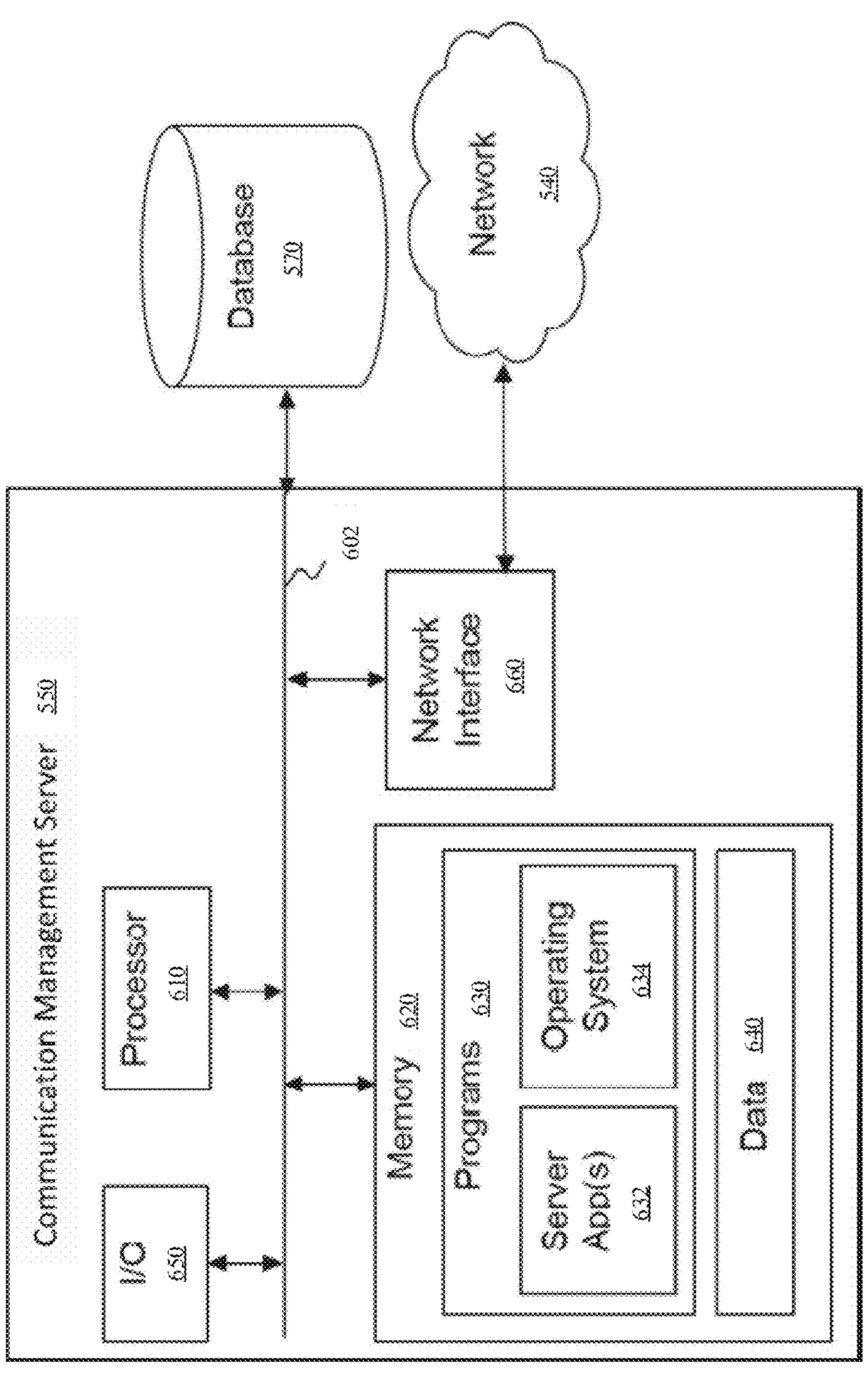
FIG. 6 is a diagram of a communication management server, in accordance with some embodiments of the present disclosure.

FIG. 6 shows a diagram of an example of communication management server 550, consistent with the disclosed embodiments. The communication management server 550 may include a bus 602 (or other communication mechanism) which interconnects subsystems or components for transferring information within the communication management server 550. As shown, the communication management server 550 may include one or more processors 610, input/output ("I/O") devices 650, network interface 660 (e.g., a modem, Ethernet card, or any other interface configured to exchange data with the network 540), and one or more memories 620 storing programs 630 including, for example, server app(s) 632, operating system 634, and data 640, and can communicate with an external database 570 (which, for some embodiments, may be included within the conference management server 550). The communication management server 550 may be a single server or may be configured as a distributed computer system including multiple servers, server farms, clouds, or computers that interoperate to perform one or more of the processes and functionalities associated with the disclosed embodiments.

The processor 610 may be one or more processing devices configured to perform functions of the disclosed methods, such as a microprocessor manufactured by Intel™ or manufactured by AMD™. The processor 610 may comprise a single core or multiple core processors executing parallel processes simultaneously. For example, the processor 610 may be a single core processor configured with virtual processing technologies. In certain embodiments, the processor 610 may use logical processors to simultaneously execute and control multiple processes. The processor 610 may implement virtual machine technologies, or other technologies to provide the ability to execute, control, run, manipulate, store, etc. multiple software processes, applications, programs, etc. In some embodiments, the processor 610 may include a multiple-core processor arrangement (e.g., dual, quad-core, etc.) configured to provide parallel processing functionalities to allow the communication management server 550 to execute multiple processes simultaneously. It is appreciated that other types of processor arrangements could be implemented that provide for the capabilities disclosed herein.

The memory 620 may be a volatile or non-volatile, magnetic, semiconductor, tape, optical, removable, non-removable, or other type of storage device or tangible or non-transitory computer-readable medium that stores one or more program(s) 630 such as server apps 632 and operating system 634, and data 640. Common forms of non-transitory media may include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication management server 550 may include one or more storage devices configured to store information used by processor 610 (or other components) to perform certain functions related to the disclosed embodiments. For example, the communication management server 550 may include memory 620 that includes instructions to enable the processor 610 to execute one or more applications, such as server apps 632, operating system 634, and any other type of application or software known to be available on computer systems. Alternatively or additionally, the instructions, application programs, etc. may be stored in an external database 570 (which can also be internal to the communication management server 550) or external storage communicatively coupled with the communication management server 550 (not shown), such as one or more database or memory accessible over the network 540.

The database 570 or other external storage may be a volatile or non-volatile, magnetic, semiconductor, tape, optical, removable, non-removable, or other type of storage device or tangible or non-transitory computer-readable medium. The memory 620 and database 670 may include one or more memory devices that store data and instructions used to perform one or more features of the disclosed embodiments. The memory 620 and database 670 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication management server 550 may be communicatively connected to one or more remote memory devices (e.g., remote databases (not shown)) through network 540 or a different network. The remote memory devices can be configured to store information that the communication management server 550 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 630 may include one or more software modules configured to cause processor 610 to perform one or more functions consistent with the disclosed embodiments. Moreover, the processor 610 may execute one or more programs located remotely from one or more components of the communication management system 500. For example, the communication management server 550 may access one or more remote programs that, when executed, perform functions related to disclosed embodiments.

In the presently described embodiment, server app(s) 632 may cause the processor 610 to perform one or more functions of the disclosed methods. For example, the server app(s) 632 may cause the processor 610 to receive facial data associated with participant users to generate their respective avatar data and to train the generated avatar data. In some embodiments, other components of the communication management system 500 may be configured to perform one or more functions of the disclosed methods. For example, user devices 520A-520E may be configured to generate avatar data and/or train the avatar data.

In some embodiments, the program(s) 630 may include the operating system 634 performing operating system functions when executed by one or more processors such as the processor 610. By way of example, the operating system 634 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 634. The communication management server 550 may also include software that, when executed by a processor, provides communications with the network 540 through the network interface 660 and/or a direct connection to one or more user devices 520A-520E.

In some embodiments, the data 640 may include conference audio, video and content to share received from user devices 520. Data 640 may further include communication session context. For example, data 640 may comprise the communication session recording and a transcription of the communication session recording. Further, data 640 may include audio data received during a meeting that is used to identify the participant user to fetch the appropriate generated avatar and/or trained avatar such that a video stream of the participant user can be generated and injected into the data stream being transmitted to other participants of the meeting.

The communication management server 550 may also include one or more I/O devices 650 having one or more interfaces for receiving signals or input from devices and providing signals or output to one or more devices that allow data to be received and/or transmitted by the communication management server 550. For example, the communication management server 550 may include interface components for interfacing with one or more input devices, such as one or more keyboards, mouse devices, and the like, that enable the communication management server 550 to receive input from an operator or administrator (not shown).

In an embodiment, ML techniques may be used to train the communication management server 550 to determine a primary portion of the content to share of the communication session.

Figure 7:
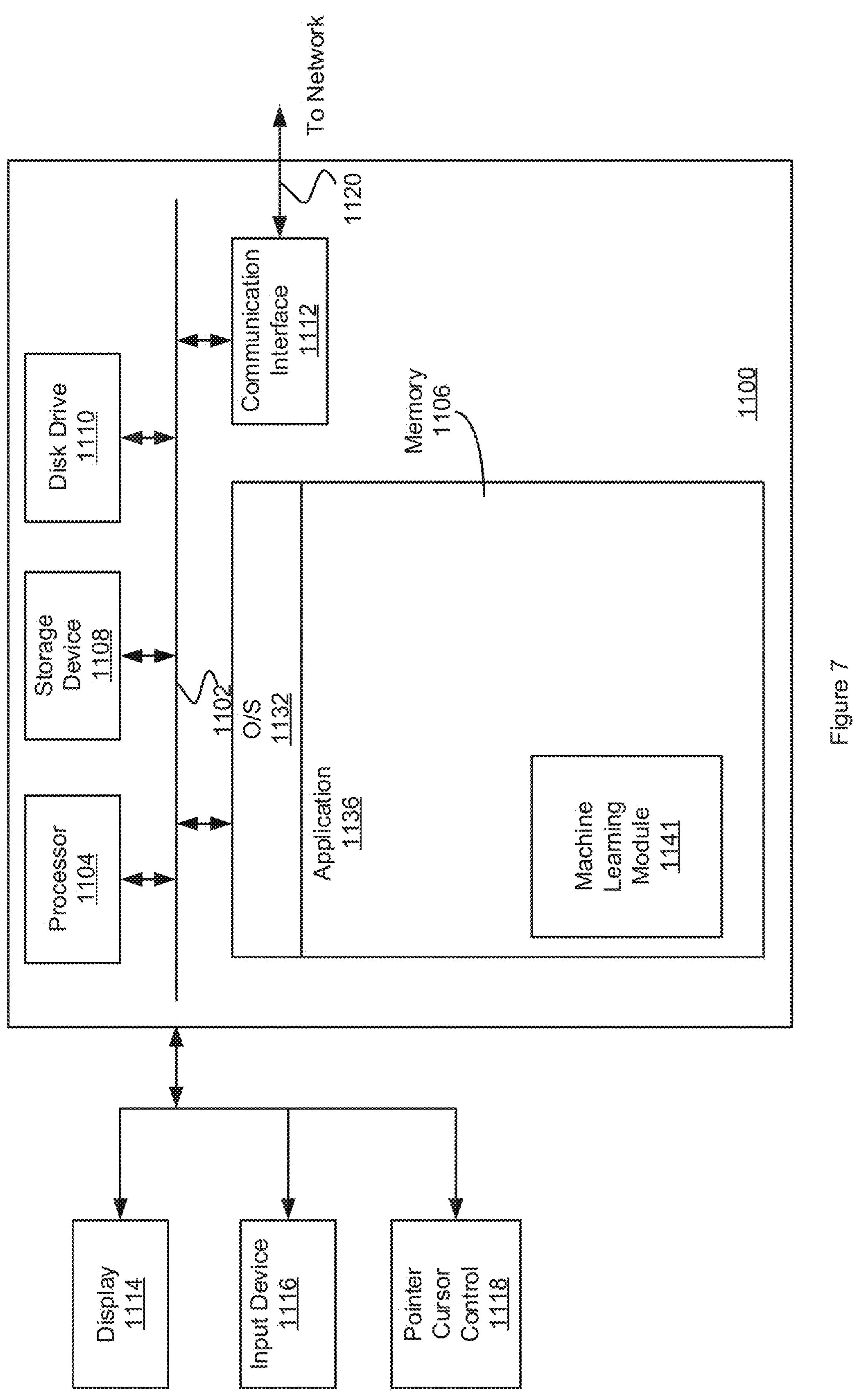
FIG. 7 is a block diagram depicting an example of computer system suitable for generating/training an avatar of a meeting participant in accordance with some embodiments.

FIG. 7 is a block diagram depicting an example of computer system suitable for generating/training an avatar of a meeting participant in accordance with some embodiments. In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions for generating one or more ML models 1141 that can be used to generate avatars associated with each participant user, to train the avatar, and ultimately to use the trained avatar to generate a video stream of the participant user when the participant user becomes an active speaker during a meeting/session.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C #, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A computer-implemented method comprising:

receiving at least one image of a face of a participant user;

generating a static avatar data of the participant user based on the at least one image using a first machine learning (ML) model;

receiving video data associated with the participant user, wherein the video data includes lips movement, eyebrows movement, jaw movement, and eyes movement of the participant user;

using a second ML model to generate animated avatar data for generating an avatar video stream, wherein input for the second ML model includes the static avatar data, the video data, and a corresponding audio stream of the participant user, wherein the second ML model is trained using the participant user's own speech to mimic the participant user's specific lips movements and accent;

wherein the animated avatar data mimics appropriate facial movements associated with the corresponding audio stream;

determining, from a meeting audio stream associated with a meeting, that the participant user is an active speaker at the meeting;

in response to determining that the participant user is the active speaker at the meeting, determining whether a meeting video stream associated with the meeting contains facial content of the active speaker;

in response to determining that the participant user is the active speaker and that the meeting video stream does not include facial content of the active speaker, retrieving the animated avatar data associated with the active speaker; and generating, based on the animated avatar data, an avatar video stream of the active speaker mimicking the meeting audio stream, wherein the active speaker is the participant user.

2. The computer-implemented method of claim 1, wherein determining that the meeting video stream does not include facial content of the active speaker comprises determining that the meeting video stream contains a whiteboard or shared screen.

3. The computer-implemented method of claim 1 further comprising:

injecting the generated avatar video stream to data being transmitted to participants of the meeting when the participant user is speaking as the active speaker.

4. The computer-implemented method of claim 3, wherein the injecting complements data being transmitted during the meeting session without video stream of the participant user.

5. The computer-implemented method of claim 1, wherein the determining that the participant user has become the active speaker comprises performing voice recognition processing of the meeting audio stream.

6. The computer-implemented method of claim 1, wherein the video data comprises video streams of one or more users speaking and wherein the one or more users are different from the participant user.

7. The computer-implemented method of claim 1, wherein the at least one image comprises at least one static image of the participant user from an application that is different from an application that facilitates an online meeting for the participant user.

8. The computer-implemented method of claim 1, wherein the at least one image comprises at least one static image of the participant user from an that facilitates an online meeting for the participant user.

9. The computer-implemented method of claim 1, wherein the at least one image comprises at least a portion of a video stream.

10. One or more non-transitory computer readable storage medium storing instructions that when executed by one or more processors, cause:

receiving at least one image of a face of a participant user;

generating a static avatar data of the participant user based on the at least one image using a first machine learning (ML) model;

receiving video data associated with the participant user, wherein the video data includes lips movement, eyebrows movement, jaw movement, and eyes movement of the participant user;

using a second ML model to generate animated avatar data for generating an avatar video stream, wherein input for the second ML model includes the static avatar data, the video data, and a corresponding audio stream of the participant user, wherein the second ML model is trained using the participant user's own speech to mimic the participant user's specific lips movements and accent;

wherein the animated avatar data mimics appropriate facial movements associated with the corresponding audio stream;

determining, from a meeting audio stream associated with a meeting, that the participant user is an active speaker at the meeting;

in response to determining that the participant user is the active speaker at the meeting, determining whether a meeting video stream associated with the meeting contains facial content of the active speaker;

in response to determining that the participant user is the active speaker and that the meeting video stream does not include facial content of the active speaker, retrieving the animated avatar data associated with the active speaker; and generating, based on the animated avatar data, an avatar video stream of the active speaker mimicking the meeting audio stream, wherein the active speaker is the participant user.

11. The non-transitory computer readable storage medium of claim 10, wherein the determining that the participant user has become the active speaker comprises performing voice recognition processing of the meeting audio stream.

12. The non-transitory computer readable storage medium of claim 10, further comprising storing instructions that when executed by one or more processors, cause:

injecting the generated avatar video stream to data being transmitted to participants of the meeting when the participant user is speaking as the active speaker.

13. The non-transitory computer readable storage medium of claim 12, wherein the injecting complements data being transmitted during the meeting session without video stream of the participant user.

14. A system, comprising:

a processor;

a memory operatively connected to the processor and storing instructions that, when executed by the processor, cause:

receiving at least one image of a face of a participant user;

generating a static avatar data of the participant user based on the at least one image using a first machine learning (ML) model;

receiving video data associated with the participant user, wherein the video data includes lips movement, eyebrows movement, jaw movement, and eyes movement of the participant user; and using a second ML model to generate animated avatar data for generating an avatar video stream, wherein input for the second ML model includes the static avatar data, the video data, and a corresponding audio stream of the participant user, wherein the second ML model is trained using the participant user's own speech to mimic the participant user's specific lips movements and accent;

wherein the animated avatar data mimics appropriate facial movements associated with the corresponding audio stream determining, from a meeting audio stream associated with a meeting, that the participant user is an active speaker at the meeting;

in response to determining that the participant user is the active speaker at the meeting, determining whether a meeting video stream associated with the meeting contains facial content of the active speaker;

in response to determining that the participant user is the active speaker and that the meeting video stream does not include facial content of the active speaker, retrieving the animated avatar data associated with the active speaker; and generating, based on the animated avatar data, an avatar video stream of the active speaker mimicking the meeting audio stream, wherein the active speaker is the participant user.

15. The system of claim 14, wherein determining that the meeting video stream does not include facial content of the active speaker comprises determining that the video stream contains a whiteboard or shared screen.

16. The system of claim 14, wherein the instructions when executed by the process further cause:

injecting the generated avatar video stream into the data being transmitted to participants of the meeting when the participant user is speaking as the active speaker.

* * * * *